United States Patent [19]

Perper

[11] 4,005,335

[45] Jan. 25, 1977

[54] HIGH FREQUENCY POWER SOURCE FOR FLUORESCENT LAMPS AND THE LIKE

[75] Inventor: Lloyd J. Perper, Tucson, Ariz.

[73] Assignee: Iota Engineering Inc., Tucson, Ariz.

[22] Filed: July 15, 1975

[21] Appl. No.: 596,069

[52] U.S. Cl. ............................... 315/224; 315/219; 315/DIG. 7; 328/8; 331/62; 331/113 A

[51] Int. Cl.² ......................................... H05B 41/29

[58] Field of Search ............... 331/62, 112, 113 A; 315/105, 106, 219, 224, DIG. 4, DIG. 7; 307/202 R; 328/8

[56] References Cited

UNITED STATES PATENTS

| 3,302,130 | 1/1967 | Minks | 331/112 |
| 3,335,316 | 8/1967 | Schneider | 331/62 X |
| 3,889,173 | 6/1975 | Klusmann et al. | 331/112 X |

FOREIGN PATENTS OR APPLICATIONS

| 1,232,654 | 1/1967 | Germany | 315/DIG. 7 |

*Primary Examiner*—Eugene La Roche
*Attorney, Agent, or Firm*—Harris, Kern, Wallen & Tinsley

[57] ABSTRACT

A power source for operating gas discharge lamps and other loads at high frequency, typically utilizing a 115 volt ac source rectified to provide a 150 volt dc input and providing a 20,000 hertz output. An inverter with a transistor current control for protection against transistor damage under open circuit, starting and no-load conditions, with low power consumption under no-load and with dimming capability. An inverter with a detector circuit connected across the feedback winding or an additional control winding for developing a control signal varying as a function of the feedback winding output, and a zener diode or other device for connecting the control signal to the base of the transistor in current controlling relation when the control signal exceeds a predetermined value.

14 Claims, 7 Drawing Figures

4,005,335

HIGH FREQUENCY POWER SOURCE FOR FLUORESCENT LAMPS AND THE LIKE

BACKGROUND OF THE INVENTION

This invention relates to a power source for gas discharge lamps and other loads operated at high frequency, and in particular is directed to a new and improved power source suitable for energizing fluorescent lamps with improved protection for components during starting, open circuit and no-load conditions, and with lamp output dimming capability. The present circuit is an improvement on that shown in U.S. patent to Campbell, U.S. Pat. No. 3,396,307 and that shown in copending application, Ser. No. 402,317, now Pat. No. 3,889,153, filed Oct. 1, 1973, and Ser. No. 530,384, filed Dec. 6, 1974 and assigned to the same assignee as the present application.

The power source of the present invention has an inverter and a ballast circuit generally similar to that of the prior art devices. In these devices, a transistor oscillator generates starting pulses and then generates the operating wave form when a load such as a fluorescent lamp, is connected.

In the use of solid state circuitry in inverters powered from a 115 volt or higher ac line with direct rectification to provide the dc input, it is readily possible for the emmitter-to-collector voltage of the transistor oscillator to build up under open circuit or no-load conditions beyond the breakdown value, with rapid and destructive results. The prior art circuitry has utilized various protective techniques including fast blow fusing in the transistor base circuit, thermal switching in the base circuit, capacitive output loading to reduce open circuit pulse amplitude, and parallel transistor operation to lower the impedance level.

None of these approaches has proven entirely satisfactory. In order to operate at sufficient base current to blow a fuse rapidly or switch thermally to a lower level, it is necessary to sacrifice the capability of an efficient low base current mode of operation. When capacitive loading is used to reduce the open circuit pulses, it also reduces the starting capability, and fast starts at low temperatures are more difficult to achieve. Parallel transistor operation represents an over design for achieving a modest reduction in voltage swing.

It is an object of the present invention to provide a new and improved inverter circuit which provides substantially instantaneous open circuit and starting protection, virtually zero power consumption under no-load, flexible and efficient dimming, early starting ability, and closed loop output controllability, with reduced needs for design compromise.

SUMMARY OF THE INVENTION

A new and novel approach to protection is used in the inverter circuit of the present invention. The voltage swing in the transistor output circuitry base is sensed and compared with an allowed amount of swing, with the excess if any being processed and fed around to the transistor base so as to inhibit the swing to any higher value. A generally conventional inverter with oscillator circuit and transformer is utilized, the transformer having primary, secondary and feedback windings and the oscillator having a transistor with emitter and collector electrodes connected in series with the primary winding across the dc input and having the base and one of the electrodes connected across the feedback winding or a separate control winding. The new features include a detector circuit connected across the feedback or control winding for developing a control signal which varies as a function of the feedback winding output and circuitry for connecting the control signal to the base of the transistor in current controlling relation when the control signal exceeds the predetermined value. Both parallel and series configurations are utilized. The predetermined value can be varied to provide control of lamp output, that is, for dimming the lamp.

DESCRIPTION OF THE PREFERRED EMBODIMENTS

Figure 1:
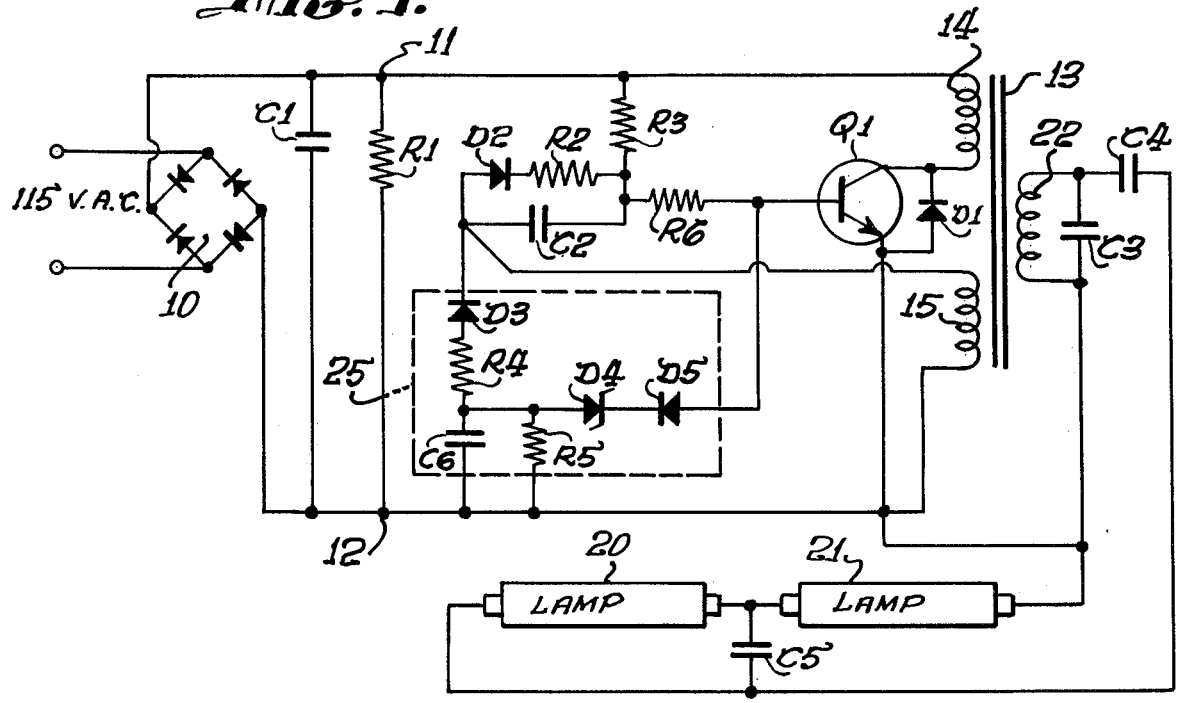
FIG. 1 is a diagram of a fluorescent lamp circuit incorporating one embodiment of the invention with a parallel configuration.

Referring to FIG. 1, a 115 volt ac supply is connected across a bridge rectifier 10 providing a rectified dc supply, typically 150 volts, across a filter capacitor C1 and resistor R1 at terminals 11, 12.

The inverter oscillator circuit includes a transformer 13 and transistor Q1, with the transformer primary winding 14 connected in series with the transistor collector and emitter across the dc input terminals 11, 12. The feedback winding 15 is connected between the terminal 12 and the transistor base through a drive circuit comprising diode D2 and resistor R2 in parallel with capacitor C2, with this parallel combination in series with resistor R6, and with another resistor R3 connected between the junction of resistors R2 and R6 and the terminal 11. A diode D1 may be connected across the transistor collector and emitter electrodes for preventing negative voltage spikes from damaging the circuit.

Lamps 20, 21 are connected in series with capacitor C4 across the transformer secondary winding 22, with a capacitor C3 also connected across the winding 22 and with a capacitor C5 connected between capacitor C4 and the junction of the lamps 20, 21. Filament windings are not required for the circuit of the invention, but may be utilized if desired. The circuitry described thus far is conventional and operates in the conventional manner. When the ac power is turned on, the circuit oscillates and provides a high frequency output, typically 20 kilohertz to the lamps.

Figure 3:
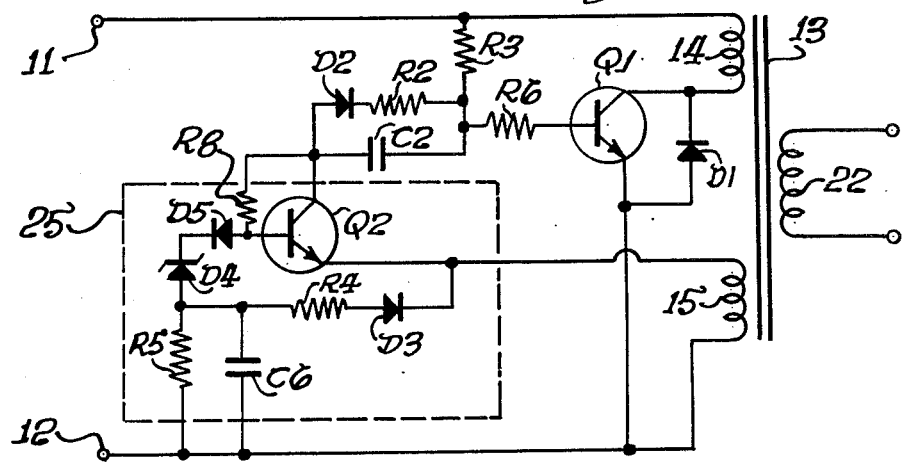
FIG. 3 is a diagram similar to that of FIG. 1 showing a series configuration for the embodiment of FIG. 1.

The new portion of the circuit is enclosed in the dashed line 25 and includes a level detector circuit for detecting the level of the output of the feedback winding 15 and developing a control signal which varies as a function of the feedback winding output, and means for connecting this control signal to the base of the transistor Q1 when the signal exceeds a predetermined level. A parallel connection for the control signal is shown in FIG. 1 and a series connection is shown in FIG. 3. In the parallel connection, the control signal pulls the transistor base negative to inhibit oscillation.

while in the series configuration the control signal opens up the base circuit and inhibits oscillation. The series configuration tends to be more complex but can be advantageous in inverter circuits with low impedance base drive and circuits where appreciable base current is drawn which would require appreciable base current in the parallel type of control.

Referring again to FIG. 1, a diode D3 is connected in series with a resistor R4 and a capacitor C6 across the feedback winding 15 or a separate winding with more turns if more control is desired. A resistor R5 may be connected across the capacitor C6 if desired. A zener diode D4 and a conventional diode D5 are connected between the junction of resistor R4 and capacitor C6 and the base of transistor Q1.

In the operation of the level detector, a voltage corresponding to the envelope of the voltage from the feedback winding 15 is generated using diode D3 as a rectifier and resistor R4 and capacitor C6 as a filter. The resistor R5 may be used if desired to provide a set decay time constant. The voltage appearing at the junction of resistor R4 and capacitor C6 is the control signal. When this filtered envelope or control voltage exceeds the drop of the diodes D4 and D5, a net negative voltage tends to appear at the base of the transistor Q1, preventing or inhibiting the positive pulses on the base needed for oscillation. The output voltage in the primary winding then drops and the negative voltage across the capacitor C6 drops with it, until the voltage across the capacitor C6 (the control signal) equals the drop across the diodes D4, D5, at which level the oscillation of the inverter can continue.

In a typical circuit, this voltage will be about 13 volts, being the sum of the 12.4 volt drop of the zener diode D4 and the forward voltage drop of the diode D5. The diode D5 may be used to prevent the control voltage from raising the base voltage under any conditions; this is an optional component and is not essential to the invention. The actual magnitude of the control signal and the control signal required to achieve the desired control are functions of the parameters of the particular circuit including the turns ratio of the primary and feedback windings and the drop of the diode D4. Control initiation can be achieved at different values of the control signal by choosing different zener diodes.

During operation, the energy that flows during the collector voltage peak is the released energy from the transformer that was stored earlier in the cycle. In order to reduce the magnitude of that released energy, the current flow beforehand is inhibited by storing the level of the previous pulse or pulses to the base and using this stored level as the control signal for reducing the positive going portion of the base current. The terms positive and negative are used in the present disclosure for the circuit shown in FIG. 1. It will be understood that the same circuit operation can be achieved with reversed polarity circuitry. Current turn-on at the transistor Q1 occurs as a result of a positive base current pulse which occurs at a first time $t_1$, followed by a discharge of the transformer energy ending at a second later time $t_2$. As the load current on the inverter increases, the interval between $t_1$ and $t_2$ decreases, but in the open circuit condition this charging interval is quite long followed by a relatively short discharge time interval between the discharge of transformer energy and the next current turn-on.

Figure 2A:
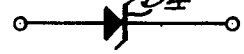
FIGS. 2a, 2b and 2c show alternative configurations for a portion of the circuit of FIG. 1.
Figure 2B:
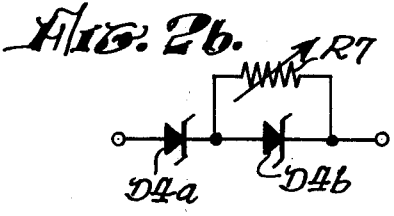

The primary voltage swing can be controlled by selecting a zener diode with a different voltage drop or by otherwise changing the predetermined value at which the control signal is coupled to the transistor base, without requiring any modification of other circuit parameters. This effect may be used to provide for dimming of the lamp output. For example, if a zener diode with a voltage drop less than 12.4 volts is substituted for the 12.4 volt zener diode D4, the output of the lamps will be reduced. In one variation of the circuit, several diodes with different voltage drops can be provided with a selector switch for connecting a selected diode into the circuit. Another alternative configuration is shown in FIG. 2b with zener diodes D4a and D4b connected in series in place of the diode D4. Each of the diodes D4a and D4b may be 6.2 volt diodes, with a variable resistor R7 connected across the diode D4b. With the resistance of resistor R7 substantially at infinity or open circuit, the output of the circuit is the same as for the diode D4. When the resistance R7 was set at 100 ohms, a 16% drop in output illumination was obtained with no loss in efficacy (efficacy is the ratio of light output to power input).

Figure 2C:
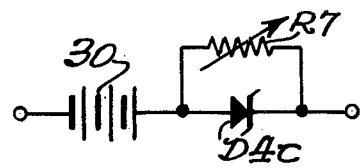

It should be noted that the zener operation is not actually so sharply defined as to occur either fully or not at all, with a sharp threshold. Such an effect could be obtained by using a series battery 30, and optionally a zener diode D4c, as shown in FIG. 2c, instead of the zener diodes D4a, D4b to produce the voltage drop. With the zener diode configuration, the effect begins at about 13 × 30/2, or 195 collector volts, with limiting at about 350 volts or more.

In effect, a slight dimming or controlling effect is present in normal operation. With reduction of the dropping voltage, this effect increases. A result of the effect is reduced dependence on transistor parameters owing to feedback stabilization, and a tendency to compensate for amplitude changes caused by line-voltage fluctuations and ripple.

The starting voltage is typically up to 50% larger than the operating voltage, but must not be permitted to exceed breakdown conditions for the transistor. The ratio of the two voltages is set by the circuit design including the secondary capacitance, and the maximum is set by the protection circuit. With the non-linear type of protection circuitry used, it was found possible to provide arc ignition at low (70 volt ac or less) line voltages and at the same time permit continuous operation with demonstrated open-circuit protection at 140 volts.

A significant effect of the protection circuitry is to reduce the open-circuit current to virtually zero as a result of imposing an increased negative bias to the transistor base. Transistor destruction by heating or power losses encountered in previous circuitry is thereby precluded.

Typical values for components in the circuit of FIG. 1 are set out below by way of example and not for the purpose of limiting the invention:

| | | | |
|---|---|---|---|
| R1 | 100,000 ohms | D1 | IN40 |
| R2 | 120 ohms | D2 | IN40 |
| R3 | 47 kohms | D3 | IN40 |
| R4 | 9 ohms | D4 | zener diode, 15 volt |
| R5 | 10,000 ohms | D5 | IN40 |
| R6 | 15 ohms | Q1 | 2N6498 or 2N6499 |
| C1 | 160 mf | lamps F-40T-12 |
| C2 | .22 mf | primary winding 30 turns |
| C3 | .0005 mf | secondary winding 100 turns |
| C4 | .0068 mf | feedback winding 2 turns |
| C5 | .0005 mf | |

-continued

| | | | |
|---|---|---|---|
| C6 | 10 mf | | |
| C4 | .0068 mf | feedback winding | 2 turns |
| C5 | .0005 mf | control winding | 3 turns |

An alternative embodiment is shown in FIG. 3 where components corresponding to those of the embodiment of FIG. 1 are identified by the same reference numerals. In the circuit of FIG. 3, the control signal developed across the capacitor C6 is connected through the diodes D4 and D5 to the base of another transistor Q2. The collector and emitter electrodes of the transistor Q2 are connected in series between the feedback winding 15 and the base of the transistor Q1, with an increase in the control signal increasing the impedance across the transistor Q2 and reducing the base drive current for the transistor Q1. An additional resistor R8 is connected across the collector and base of the transistor Q2 for the purpose of raising the potential of the base above the potential of the emitter of the transistor Q2 so that the transistor will conduct. The operation of the remainder of the circuit of FIG. 3 is the same as that of the circuit of FIG. 1.

Figure 4:
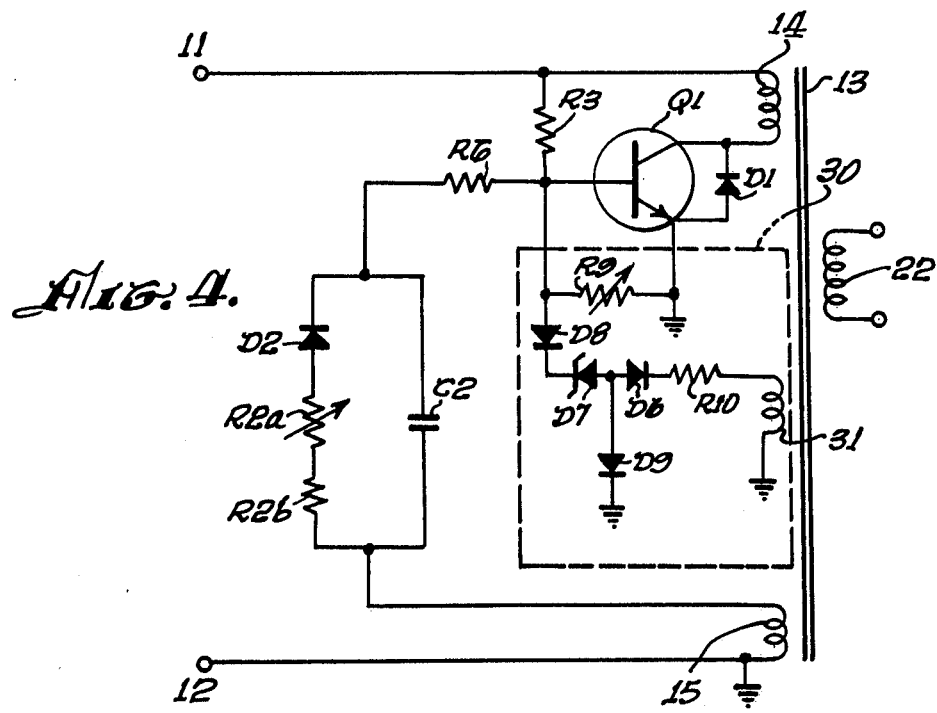
FIG. 4 is a diagram similar to that of FIG. 1 showing an alternative and presently preferred embodiment of the invention.
Figure 5:
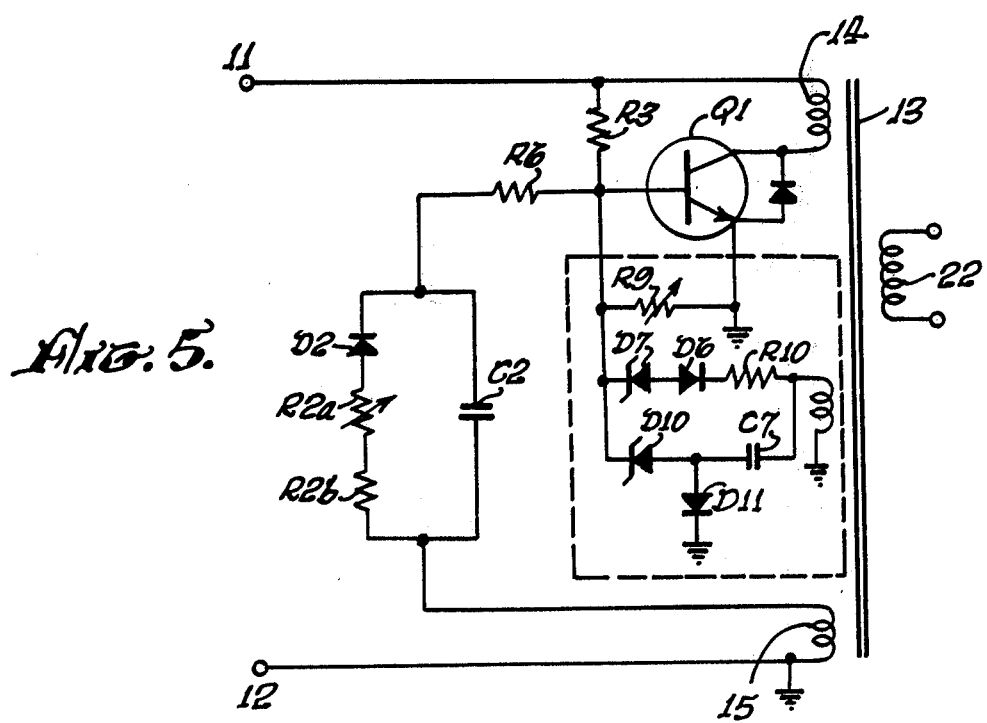
FIG. 5 is a diagram showing an alternative form of the circuit of FIG. 4.

In the embodiments shown in FIGS. 1 and 3, the detector circuit operates on the positive excursion of the input which is rectified, smoothed and utilized for control a half cycle later. An alternative embodiment is shown in FIGS. 4 and 5 which uses the negative excursion of the input directly without a storage or smoothing capacitor. The circuits of FIGS. 3, 4 and 5 may have the same ac input and same load as the circuit of FIG. 1.

Referring to FIG. 4, the new portion of the circuit is shown in the dashed rectangle 30 and includes a control winding 31 on the transformer 13, with a detector circuit connected across the control winding and comprising resistor R10, diode D6, zener diode D7 and resistor R9. Diodes D8 and D9 may be used if desired, but are not necessary in the circuit. The junction of resistor R9 and diode D8 is connected to the base of the transistor Q1.

One significant advantage of the circuitry and particularly the FIG. 4 circuit is the capability of providing substantially constant light output from fluorescent lamps energized from the power source while the ac input varies over a wide range, typically 75 to 140 volts. The substantially constant light output is due to the decrease in the supply current as a result of decreasing current duty cycle with increasing supply voltage. At the same time, the desired limiting of collector voltage peaks during open circuit operation is achieved, with the open circuit current reduced to substantially zero. Also, lamp dimming may be accomplished by increasing the magnitude of the resistor R9, or of R2a, or by placing a resistor in parallel with the zener diode, as shown in FIG. 2b.

Typical values for components in the circuit of FIG. 4 are set out below by way of example and not for the purpose of limiting the invention.

| | | | | |
|---|---|---|---|---|
| R1 | 100,000 | ohms | D1 | IN40 |
| R2a | 500 | ohms | D2 | IN40 |
| R2b | 130 | ohms | D6 | IN40 |
| R3 | 39 | kohms | D7 | zener diode, 12 volt |
| R6 | 43 | ohms | D8 | IN40 |
| R9 | 510 | ohms | D9 | IN40 |
| R10 | 39 | ohms | Q1 | 2N6498 or 2N6499 |
| C1 | 40 | mf | lamps | F-40T-12 |
| C2 | .22 | mf | primary winding | 32 turns |
| C3 | .0033 | mf | secondary winding | 90 turns |

An alternative configuration is shown in FIG. 5 with a clamping circuit comprising capacitor C7 and diode D11, with the voltage at the junction of the capacitor C7 and diode D11 connected to the transistor base through another zener diode D10. Typically, the capacitor C7 is 3 microfarads, the diode D11 is a IN40 and the diode D10 is a 12 volt zener. In operation, the clamping circuit tends to generate a large voltage swing during open circuit operation while the diode D6 tends to provide a large voltage swing during loaded operation. The combination circuit of FIG. 5 provides the circuit designer with more parameters which may be optionally changed to change for independently setting the open circuit and closed circuit control conditions.

In the circuit as shown in FIG. 4 with the load open-circuited, the collector voltage peaks are limited to less than 500 volts, with the open circuit current reduced to substantially zero, thereby avoiding voltage breakdown in the transistor.

With the load connected, ignition occurs at about 400 volts peak collector voltage, droping to about 300 volts thereafter. As the line voltage increases, the conduction time decreases, reducing current flow, while the light output remains substantially constant.

The storage capacitor C6 is not needed since the negative control voltage is supplied through the zener diode D7 to the transistor base during the conduction time. In the circuit of FIG. 1, the control voltage is produced during the cutoff time and is maintained by capacitor memory.

An actual circuit as shown in FIG. 4 will operate over an input voltage range of 100 to 140 volts ac with less than 10% variation in light output, and can be dimmed by 30 to 40% with little drop in efficacy, while providing transistor protection against open circuit failure throughout the 100 to 140 volts ac input range.

A further advantage of the circuit of FIG. 4 involves the lengthening of the load current duty cycle and the reduction of the load current peaks (at 60 Hz) for power load compatibility. Since the light output is maintined substantially constant over a range of dc supply voltages to the oscillator, it is possible to accept a spread of voltages without introducing light flicker.

The magnitude of the filter capacitor C1 at the ac bridge rectifier output may be reduced from 160 mf to 40 mf. This results in an increased output ripple from $\leq$ °% to $\geq$ 40% and a reduction of the mean voltage from about 160 v to $\leq$ 150 v.

The conduction portion of the current cycle is thereby increased some 10% in length and the peak current approximately 10%. The cost of the filter capacitor, a major expense item, is substantially reduced, and the average operating dc voltage is reduced to a level more favorable for efficient operation of the transistor circuitry employed. However the light output is unaffected.

This principle may be extended to increase the current duty cycle to larger values if desired, by causing the ripple to be increased using smaller filter capacitance, and adjusting the circuit parameters to maintain light output down to lower or up to higher voltages. It may also be applied to facilitate operation on 240 volt ac lines or 3-phase ac without stepdown transformers.

In the circuit of FIG. 4, the zener diode D7 is used to pull the base of the transistor negative when the anode of D7 goes negative by more than 12 volts. This action serves to limit the buildup of collector voltage above the threshold set by the zener.

Since the output of the control winding 31 goes positive as well as negative, and since diode D7 conducts positive current flow, the diode D6 is used to open the circuit when the flow of current would be in the direction which would increase base voltage.

Resistor R10 adjusts the effect of the feedback circuit. Using 30 ohms as shown, the collector voltage approximately flattens out at 400 volts under open-circuit conditions when the supply voltage is increased past the limiting value. A larger resistance could cause a rising characteristic and a smaller resistance could casue a decreasing collector voltage with increasing supply voltage.

Diodes D8 and D9 are shown in FIG. 4, but not in FIG. 5, and may be omitted. D8 may be employed to prevent the rectified transformer output from going positive owing to the small backward conductance of diode D6. However this is of only secondary importance in the circuit. Diode D9 is then no longer needed since it adds nothing important to the function of diode D6, with which it would be in series.

Resistor R9 lowers the base impedance to ground, reducing the tendancy toward spurious modes of oscillation. It also serves to hold the base less negative than it would otherwise be, thereby increasing the current through the transistor. Resistor R3 serves to provide a positive starting voltage to the transistor base, and may be placed as shown in FIG. 4 or in FIG. 1.

I claim:

1. In a high frequency power source for a load such as gas discharge lamps, and having an inverter with oscillator circuit and transformer, said transformer having primary, secondary and feedback windings, said oscillator circuit including a transistor having emitter and collector electrodes connected in series with said primary winding across a pair of dc input terminals and having the base and one of said electrodes connected across said feedback winding, the improvement comprising:
    a detector circuit connected across the transistor output developed at a winding of said transformer for developing a control signal varying as a function of said transistor output; and
    first means for connecting said control signal to the base of said transistor in parallel with the output of said feedback winding in current controlling relation when said control signal exceeds a predetermined value, said first means including a zener diode and a second diode connected in series in opposing polarity between said detector circuit and transistor base.

2. A power source as defined in claim 1 wherein said detector circuit includes a rectifier and filter connected across said winding developing said transistor output.

3. A power source as defined in claim 1 wherein said detector circuit includes a third diode in series with a resistor and capacitor connected across said winding developing said transistor output.

4. A power source as defined in claim 3 including an additional resistor connected in parallel with said capacitor.

5. A power source as defined in claim 1 wherein said first means includes means for varying said predetermined value.

6. A power source as defined in claim 1 wherein said first means includes a dc supply connected between said detector circuit and said base.

7. A power source as defined in claim 1 including a variable resistor connected in parallel with said zener diode.

8. A power source as defined in claim 1 wherein said first means includes two zener diodes connected in series between said detector circuit and said base, with a variable resistor connected in parallel with one of said diodes.

9. In a high frequency power source for a load such as gas discharge lamps, and having an inverter with oscillator circuit and transformer, said transformer having primary, secondary and feedback windings, said oscillator circuit including a transistor having emitter and collector electrodes connected in series with said primary winding across a pair of dc input terminals and having the base and one of said electrodes connected across said feedback winding, the improvement comprising:
    a control winding on said transformer;
    a detector circuit connected across said control winding for developing an unaveraged control signal varying as an instantaneous function of the control winding output,
    said detector circuit including a zener diode and a second diode connected in series in opposing polarity between said control winding and transistor base in current controlling relation when said control signal exceeds a predetermined value.

10. A power source as defined in claim 9 including a resistance connected in parallel with said zener diode.

11. A power source as defined in claim 9 wherein said resistance is variable for varying the light output.

12. A power source as defined in claim 9 wherein said resistance includes first and second resistors in series with said diodes.

13. A power source as defined in claim 9 including a clamping circuit connected across said control winding, and second means for connecting the clamped voltage to said transistor.

14. A power source as defined in claim 13 wherein said clamping circuit includes a capacitor and a third diode connected at a junction, and said second means includes a zener diode connected at said junction.

* * * * *